(12) United States Patent
Gara et al.

(10) Patent No.: US 8,275,964 B2
(45) Date of Patent: Sep. 25, 2012

(54) HARDWARE SUPPORT FOR COLLECTING PERFORMANCE COUNTERS DIRECTLY TO MEMORY

(75) Inventors: Alan Gara, Yorktown Heights, NY (US); Valentina Salapura, Yorktown Heights, NY (US); Robert W. Wisniewski, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 12/684,172

(22) Filed: Jan. 8, 2010

(65) Prior Publication Data
US 2011/0173402 A1     Jul. 14, 2011

(51) Int. Cl.
*G06F 12/00* (2006.01)
(52) U.S. Cl. .............. 711/167; 711/162; 711/E12.001; 711/154
(58) Field of Classification Search ............... 711/100, 711/163, 167, 154, E12.001, 162
See application file for complete search history.

(56) References Cited

U.S. PATENT DOCUMENTS

| | | |
|---|---|---|
| 2003/0225865 A1 | 12/2003 | Koestler et al. |
| 2005/0081101 A1 | 4/2005 | Love et al. |
| 2006/0167658 A1 | 7/2006 | Mericas |
| 2006/0224838 A1 | 10/2006 | Blumrich et al. |
| 2006/0230391 A1 | 10/2006 | Alexander, III et al. |
| 2008/0177756 A1 | 7/2008 | Kosche et al. |

FOREIGN PATENT DOCUMENTS
RD     481001 A  *  4/2004

OTHER PUBLICATIONS
International Search Report issued Dec. 28, 2010 in corresponding PCT Application No. PCT/US10/53639.

* cited by examiner

*Primary Examiner* — Pierre-Michel Bataille
(74) *Attorney, Agent, or Firm* — Scully, Scott, Murphy & Presser, P.C.; Daniel P. Morris, Esq.

(57) ABSTRACT

Hardware support for collecting performance counters directly to memory, in one aspect, may include a plurality of performance counters operable to collect one or more counts of one or more selected activities. A first storage element may be operable to store an address of a memory location. A second storage element may be operable to store a value indicating whether the hardware should begin copying. A state machine may be operable to detect the value in the second storage element and trigger hardware copying of data in selected one or more of the plurality of performance counters to the memory location whose address is stored in the first storage element.

24 Claims, 5 Drawing Sheets

HARDWARE SUPPORT FOR COLLECTING PERFORMANCE COUNTERS DIRECTLY TO MEMORY

STATEMENT REGARDING FEDERALLY SPONSORED RESEARCH OR DEVELOPMENT

This invention was made with Government support under Contract No.: B554331 awarded by Department of Energy. The Government has certain rights in this invention.

CROSS-REFERENCE TO RELATED APPLICATIONS

The present invention is related to the following commonly-owned, U.S. patent applications filed on even date herewith, the entire contents and disclosure of each of which is expressly incorporated by reference herein as if fully set forth herein. U.S. patent application Ser. No. 12/684,367, filed Jan. 8, 2010, for "USING DMA FOR COPYING PERFORMANCE COUNTER DATA TO MEMORY"; U.S. patent application Ser. No. 12/684,190, filed Jan. 8, 2010, for "HARDWARE ENABLED PERFORMANCE COUNTERS WITH SUPPORT FOR OPERATING SYSTEM CONTEXT SWITCHING"; U.S. patent application Ser. No. 12/684,496, filed Jan. 8, 2010, for "HARDWARE SUPPORT FOR SOFTWARE CONTROLLED FAST RECONFIGURATION OF PERFORMANCE COUNTERS"; U.S. patent application Ser. No. 12/684,429, filed Jan. 8, 2010, for "HARDWARE SUPPORT FOR SOFTWARE CONTROLLED FAST MULTIPLEXING OF PERFORMANCE COUNTERS"; U.S. patent application Ser. No. 12/697,799, filed on Feb. 1, 2010, for "CONDITIONAL LOAD AND STORE IN A SHARED CACHE"; U.S. patent application Ser. No. 12/684,738, filed Jan. 8, 2010, for "DISTRIBUTED PERFORMANCE COUNTERS"; U.S. patent application Ser. 61/261,269, filed Nov. 13, 2009, for "LOCAL ROLLBACK FOR FAULT-TOLERANCE IN PARALLEL COMPUTING SYSTEMS"; U.S. patent application Ser. No. 12/684,860, filed Jan. 8, 2010, for "PAUSE PROCESSOR HARDWARE THREAD UNTIL PIN"; U.S. patent application Ser. No. 12/684,174, filed Jan. 8, 2010, for "PRECAST THERMAL INTERFACE ADHESIVE FOR EASY AND REPEATED, SEPARATION AND REMATING"; U.S. patent application Ser. No. 12/684,184, filed Jan. 8, 2010, for "ZONE ROUTING IN A TORUS NETWORK"; U.S. patent application Ser. No. 12/684,852, filed Jan. 8, 2010, for "PROCESSOR RESUME UNIT"; U.S. patent application Ser. No. 12/684,642, filed Jan. 8, 2010, for "TLB EXCLUSION RANGE"; U.S. patent application Ser. No. 12/684,804, filed Jan. 8, 2010, for "DISTRIBUTED TRACE USING CENTRAL PERFORMANCE COUNTER MEMORY"; U.S. patent application Ser. No. 13/008,602, filed Jan. 18, 2011, for "CACHE DIRECTORY LOOKUP READER SET ENCODING FOR PARTIAL CACHE LINE SPECULATION SUPPORT"; U.S. patent application Ser. No. 61/293,237, filed Jan. 8, 2010, for "ORDERING OF GUARDED AND UNGUARDED STORES FOR NO-SYNC I/O"; U.S. patent application Serial No. 12/693,972, filed Jan. 26, 2010, for "DISTRIBUTED PARALLEL MESSAGING FOR MULTIPROCESSOR SYSTEMS"; U.S. patent application Ser. No. 12/688,747, filed Jan. 15, 2010, for "SUPPORT FOR NON-LOCKING PARALLEL RECEPTION OF PACKETS BELONGING TO A SINGLE MEMORY RECEPTION FIFO"; U.S. patent application Ser. No. 12/688,773, filed Jan. 15, 2010, for "OPCODE COUNTING FOR PERFORMANCE MEASUREMENT"; U.S. patent application Ser. No. 12/684,776, filed Jan. 8, 2010, for "MULTI-INPUT AND BINARY REPRODUCIBLE, HIGH BANDWIDTH FLOATING POINT ADDER IN A COLLECTIVE NETWORK"; U.S. patent application Ser. No. 13/004,007, filed Jan. 10, 2011, for "MULTI-PETASCALE HIGHLY EFFICIENT PARALLEL SUPERCOMPUTER"; U.S. patent application Ser. No. 12/984,252, filed Jan. 4, 2011, for "CACHE WITHIN A CACHE"; U.S. patent application Ser. No. 13/008,502, filed Jan. 18, 2011, for "MULTIPROCESSOR SYSTEM WITH MULTIPLE CONCURRENT MODES OF EXECUTION"; U.S. patent application Ser. No. 13/008,583, filed Jan. 18, 2011, for "READER SET ENCODING FOR DIRECTORY OF SHARED CACHE MEMORY IN MULTIPROCESSOR SYSTEM"; U.S. patent application Ser. No. 12/984,308 filed on Jan. 4, 2011, for "EVICT ON WRITE, A MANAGEMENT STRATEGY FOR A PREFETCH UNIT AND/OR FIRST LEVEL CACHE IN A MULTIPROCESSOR SYSTEM WITH SPECULATIVE EXECUTION"; U.S. patent application Ser. No. 12/984,329 filed Jan. 4, 2011, for "PHYSICAL ALIASING FOR THREAD LEVEL SPECULATION WITH A SPECULATION BLIND CACHE"; 61/293,552, filed Jan. 8, 2010, for "LIST BASED PREFETCH"; U.S. patent application Ser. No. 12/684,693, filed Jan. 8, 2010, for "PROGRAMMABLE STREAM PREFETCH WITH RESOURCE OPTIMIZATION"; U.S. patent application Ser. No. 13/004,005, filed Jan. 10, 2011, for "NON-VOLATILE MEMORY FOR CHECKPOINT STORAGE"; U.S. patent application Ser. No. 61/293,476, filed Jan. 8, 2010, for "NETWORK SUPPORT FOR SYSTEM INITIATED CHECKPOINTS"; U.S. patent application Ser. No. 12/696,746, filed on Jan. 29, 2010, for "TWO DIFFERENT PREFETCH COMPLEMENTARY ENGINES OPERATING SIMULTANEOUSLY"; U.S. patent application Ser. No. 12/697,015, filed on Jan. 29, 2010, for "DEADLOCK-FREE CLASS ROUTES FOR COLLECTIVE COMMUNICATIONS EMBEDDED IN A MULTI-DIMENSIONAL TORUS NETWORK"; U.S. patent application Ser. No. 61/293,559, filed Jan. 8, 2010, for "RELIABILITY AND PERFORMANCE OF A SYSTEM-ON-A-CHIP BY PREDICTIVE WEAR-OUT BASED ACTIVATION OF FUNCTIONAL COMPONENTS"; U.S. patent application Ser. No. 12/727,984, filed Mar. 19, 2010, for "EFFICIENCY OF STATIC CORE TURN-OFF IN A SYSTEM-ON-A-CHIP WITH VARIATION"; U.S. patent application Ser. No. 12/697,043, Jan. 29, 2010, for "IMPLEMENTING ASYNCHRONOUS COLLECTIVE OPERATIONS IN A MULTI-NODE PROCESSING SYSTEM"; U.S. patent application Ser. No. 13/008,546, filed Jan. 18, 2011, for "ATOMICITY: A MULTI-PRONGED APPROACH"; U.S. patent application Ser. No. 12/697,175, filed Jan. 29, 2010 for "I/O ROUTING IN A MULTIDIMENSIONAL TORUS NETWORK"; U.S. patent application Ser. No. 12/684,287, filed Jan. 8, 2010 for ARBITRATION IN CROSSBAR FOR LOW LATENCY; U.S. patent application Ser. No. 12/684,630, filed Jan. 8, 2010, for "EAGER PROTOCOL ON A CACHE PIPELINE DATAFLOW"; U.S. patent application Ser. No. 12/723,277, filed Mar. 12, 2010 for EMBEDDED GLOBAL BARRIER AND COLLECTIVE IN A TORUS NETWORK; U.S. patent application Ser. No. 12/696,764, filed Jan. 29, 2010 for "GLOBAL SYNCHRONIZATION OF PARALLEL PROCESSORS USING CLOCK PULSE WIDTH MODULATION"; U.S. patent application Ser. No. 12/796,411, filed Jun. 8, 2010 for "GENERATION-BASED MEMORY SYNCHRONIZATION IN A MULTIPROCESSOR SYSTEM WITH WEAKLY CONSISTENT MEMORY ACCESSES"; U.S. patent application Ser. No. 12/796,389, filed Jun. 8, 2010 for BALANCING WORKLOAD IN A MULTIPROCESSOR SYSTEM RESPONSIVE TO PROGRAMMABLE ADJUSTMENTS IN A SYNCRONIZATION INSTRUCTION; U.S. patent application Ser. No. 12/696,817, filed Jan. 29, 2010 for HEAP/STACK GUARD PAGES USING A WAKEUP UNIT; U.S. patent application Ser. No. 61/293,603, filed Jan. 8, 2010 for MECHANISM OF SUPPORTING SUB-COMMUNICATOR COLLECTIVES WITH O(64) COUNTERS AS OPPOSED TO ONE COUNTER FOR EACH SUB-COMMUNICATOR; and U.S. patent application Ser. No. 12/774,475, filed May 5, 2010 for "REPRODUCIBILITY IN A MULTIPROCESSOR SYSTEM".

FIELD OF INVENTION

The present disclosure relates to computer systems, and more particularly to hardware support for collecting performance counter data directly to memory.

BACKGROUND

Understanding the performance of programs running on today chips is complicated. Programs themselves are becoming increasingly complex and intertwined with a growing number of layers in the software stack. Hardware chips are also becoming more complex. The current generation of chips is multicore and the next generation will be likely to have even more cores and will include networking, switches, and other components integrated on to the chip.

Performance counters can help programmers address the challenges created by the above complexity by providing insight into what is happening throughout the chip, in the functional units, in the caches, and in the other components on the chip. Performance counter data also helps programmers understand application behavior. Chips have incorporated performance counter events for several generations, and software ecosystems have been designed to help analyze the data provided by such counters.

Hardware performance counters provide insight into the behavior of the various aspects of a chip. Generally, hardware performance counters are extra logic added to the central processing unit (CPU) to track low-level operations or events within the processor. For example, there are counter events that are associated with the cache hierarchy that indicate how many misses have occurred at L1, L2, and the like. Other counter events indicate the number of instructions completed, number of floating point instructions executed, translation lookaside buffer (TLB) misses, and others. Depending on the chip there are 100s to a 1000 or so counter events that provide information about the chip. However, most chip architectures only allow a small subset of these counter events to be counted simultaneously due to a small number of performance counters implemented There are several engineering reasons why it is difficult to gather a large number of counters. One is that some of the useful data originates in areas of the chip where area is a very scarce resource. Another reason is that trying to provide paths and multiplexers to export many counters takes power and area that is not available. Counters themselves are implemented as latches, and a large number of large counters require large area and power. What is needed is an efficient mechanism to best utilize the limited performance counters that are available.

Software uses the values from performance counters. To get these values, performance counters have to explicitly be read out. Depending where the counters are located, they are read out either as a set of registers, or as a set of memory locations (memory mapped registers—MMRs). The code to read the counters implements one load instruction for each read request for each counter. For a system with larger number of counters, and/or where the counter access latency is large, reading out all counters will have longer latency and will block the processor handling this function call during that time.

BRIEF SUMMARY

A device and method for hardware supported performance counter data collection are provided. The device, in one aspect, may include a plurality of performance counters operable to collect one or more counts of one or more selected activities. A first storage element may be operable to store an address of a memory location, and a second storage element may be operable to store a value indicating whether the hardware should begin copying. A state machine is operable to detect the value in the second storage element and trigger hardware copying of data in selected one or more of the plurality of performance counters to the memory location whose address is stored in the first storage element.

A device for hardware supported performance counter data collection, in another aspect, may include a plurality of performance counters operable to collect one or more counts of one or more selected activities. A first storage element may be operable to store data value representing time interval. A timer element may be operable to read the data value and detect expiration of the time interval based on the data value. A second storage element may be operable to store an address of a memory location. A state machine may be operable to receive the signal associated with the detected expiration of the time interval and trigger hardware copying of data in selected one or more of the plurality of performance counters to the memory location whose address is stored in the second storage element.

Yet in another aspect, a device for hardware supported performance counter data collection may include a plurality of performance counters operable to collect one or more counts of one or more selected activities. A storage element may be operable to store an address of a memory location. A state machine may be operable to receive a signal to trigger hardware copying of data in selected one or more of the plurality of performance counters to the memory location whose address is stored in the storage element.

A method for hardware supported performance counter data collection, in one aspect, may include a software thread writing into a first storage element an address of memory, and a software thread writing into a second storage element an indication of whether to copy. The method may also include a hardware thread detecting the indication of whether to copy from the second storage element and in response to detecting that the hardware should copy, performing a copy of data in one or more performance counters to memory region indicated by the address.

A computer readable storage medium storing a program of instructions executable by a machine to perform one or more methods described herein may be also provided.

Further features as well as the structure and operation of various embodiments are described in detail below with reference to the accompanying drawings. In the drawings, like reference numbers indicate identical or functionally similar elements.

DETAILED DESCRIPTION

The present disclosure, in one aspect, describes hardware support to facilitate transferring the performance counter data between the hardware performance counters and memory. One or more hardware capability and configurations are disclosed that allow software to specify a memory location and have the hardware engine copy the counters without the software getting involved. In another aspect, the software may specify a sequence of memory locations and have the hardware perform a sequence of copies from the hardware performance counter registers to the sequence of memory locations specified by software. In this manner, the hardware need not interrupt the software.

The mechanism of the present disclosure combines hardware and software capabilities to allow for efficient movement of hardware performance counter data between the registers that hold that data and a set of memory locations. The following description of the embodiments uses the term "hardware" interchangeably with the state machine and associated registers used for controlling the automatic copying of the performance counter data to memory. Further, the term "software" may refer to the hypervisor, operating system, or another tool that either of those layers has provided direct access to. For example the operating system could set up a mapping, allowing a tool with the correct permission, to interact directly with the hardware state machine.

A direct memory engine (DMA) may be used to copy the values of performance monitoring counters from the performance monitoring unit directly to the memory without intervention of software. The software may specify the starting address of the memory where the counters are to be copied, and a number of counters to be copied.

After initialization of the DMA engine in the performance monitoring unit by software, other functions are performed by hardware. Events are monitored and counted, and an element such as a timer keeps track of time. After a time interval expires, or another triggering event, the DMA engine starts copying counter values to the predestined memory locations. For each performance counter, the destination memory address is calculated, and a set of signals for writing the counter value into the memory is generated. After all counters are copied to memory, the timer (or another triggering event) may be reset.

Figure 1:
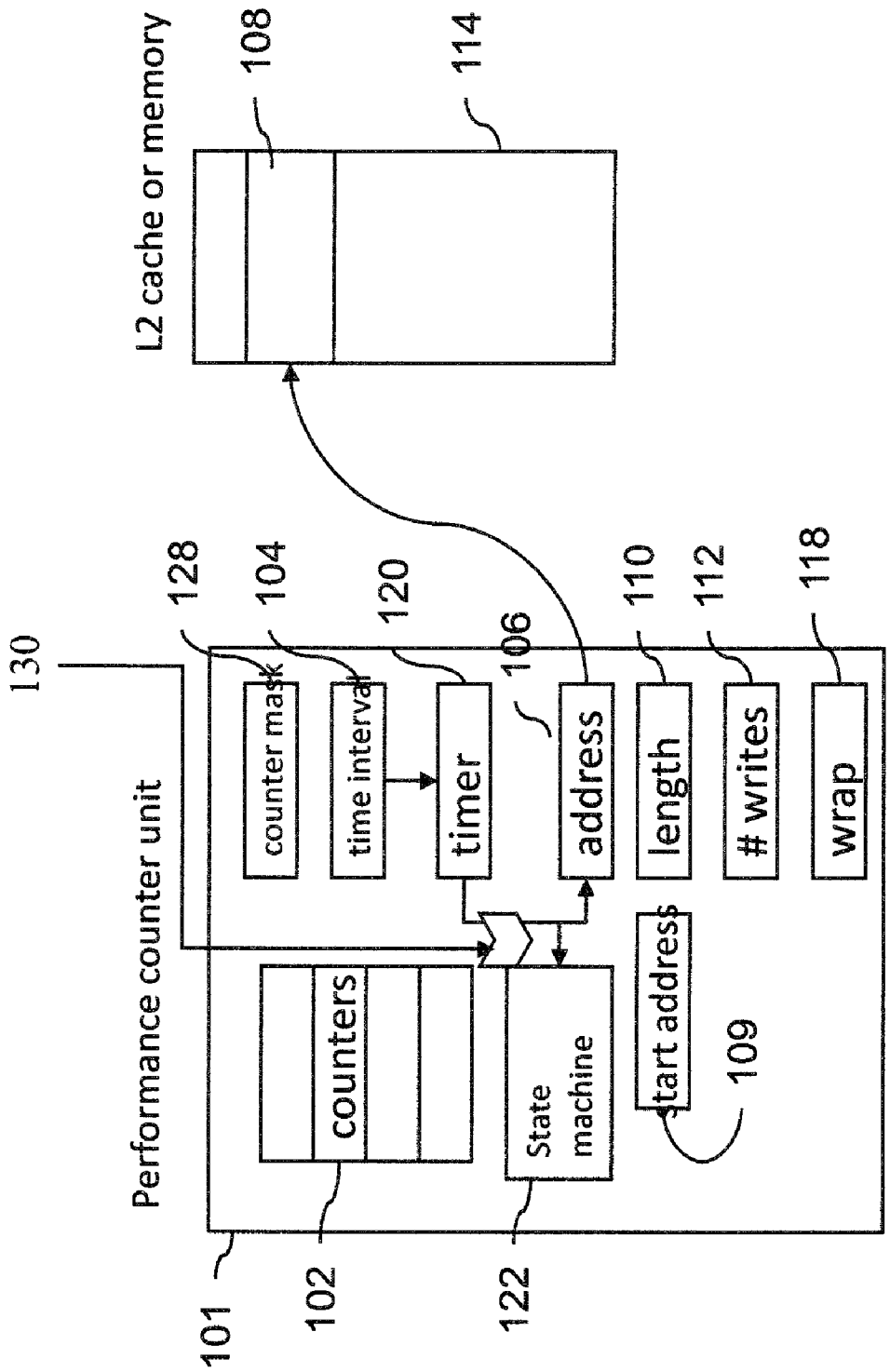
FIG. 1 is a diagram illustrating a hardware unit with a series of control registers that support collecting of hardware counter data to memory in one embodiment of the present disclosure.

FIG. 1 is a diagram illustrating a hardware unit with a series of control registers. The hardware unit 101 includes hardware performance counters 102, which may be implemented as registers, and collect information on various activities and events occurring on the processor.

The device 101 may be built into a microprocessor and includes a plurality of hardware performance counters 102, which are registers used to store the counts of hardware-related activities within a computer. Examples of activities of which the counters 102 may store counts may include, but are not limited to, cache misses, translation lookaside buffer (TLB) misses, the number of instructions completed, number of floating point instructions executed, processor cycles, input/output (I/O) requests, and other hardware-related activities and events.

Other examples may include, but are not limited to, events related to the network activity, like number of packets sent or received in each of networks links, errors when sending or receiving the packets to the network ports, or errors in the network protocol, events related to the memory activity, for example, number of cache misses for any or all cache level L1, L2, L3, or the like, or number of memory requests issued to each of the memory banks for on-chip memory, or number of cache invalidates, or any memory coherency related events. Yet more examples may include, but are not limited to, events related to one particular processor's activity in a chip multi-processor systems, for example, instructions issued and completed, integer and floating-point, for the processor 0, or for any other processor, the same type of counter events but belonging to different processors, for example, the number of integer instructions issued in all N processors. Those are some of the examples activities and events the performance counters may collect.

A register or a memory location 104 may specify the frequency at which the hardware state machine should copy the hardware performance counter registers 102 to memory. Software, such as the operating system, or a performance tool the operating system has enabled to directly access the hardware state machine control registers, may set this register to frequency at which it wants the hardware performance counter registers 102 sampled.

Another register or memory location 109 may provide the start memory location of the first memory address 108. For example, the software program running in address space A, may have allocated memory to provide space to write the data. A segmentation fault may be generated if the specific memory location is not mapped writable into the user address space A, that interacted with the hardware state machine 122 to set up the automatic copying.

Yet another register or memory location 110 may indicate the length of the memory region to be written to. For each counter to be copied, hardware calculates the destination address, which is saved in the register 106.

For the hardware to automatically and directly perform copy of data from the performance counters 102 to store in the memory area 114, the software may set a time interval in the register 104. The time interval value is copied into the timer 120 that counts down, which upon reaching zero, triggers a state machine 122 to invoke copying of the data to the address of memory specified in register 106. For each new value to be stored, the current address in register 106 is calculated. When the interval timer reaches zero, the hardware may perform the copying automatically without involving the software.

In addition, or instead of using the time interval register 104 and timer 120, an external signal 130 generated outside of the performance monitoring unit may be used to start direct copying. For example, this signal may be an interrupt signal generated by a processor, or by some other component in the system.

Optionally, a register or memory location 128 may contain a bit mask indicating which of the hardware performance counter registers 102 should be copied to memory. This allows software to choose a subset of the registers of critical registers. Copying and storing only a selected set of hardware performance counters may be more efficient in terms of the amount of the memory consumed to gather the desired data.

In one aspect, hardware may be responsible for ensuring that memory address is valid. In this embodiment, state machine 122 checks for each address if it is within the memory area specified by the starting address, as specified in 109, and length value, as specified in 110. In the case the address is beyond that boundary, an interrupt signal for segmentation fault may be generated for the operating system.

In another aspect, software may be responsible to keep track of the available memory and to provide sufficient memory for copying performance counters. In this embodiment, for each counter to be copied, hardware calculates the next address without making any address boundary checks.

Another register or memory location 112 may store a value that specifies the number of times to write the above specified hardware performance counters to memory 114. This register may be decremented every time a DMA engine starts its copying all, or selected counters to the memory. After this register reached zero, the counters are no more copied until the next re-programming by software. Alternatively or additionally, the value may include an on or off bit which indicates whether the hardware should collect data or not.

The memory location for writing and collecting the counter data may be a pre-allocated block 108 at the memory 114 such as L2 cache or another with a starting address (e.g., specified in 109) and a predetermined length (e.g., specified in 110). In one embodiment, the block 108 may be written once until the upper boundary is reached, after which an interrupt signal may be initialized, and further copying is stopped. In another embodiment, memory block 108 is arranged as a circular buffer, and it is continuously overwritten each time the block is filled. In this embodiment, another register 118 or memory location may be used to store an indication as to whether the hardware should wrap back to the beginning of the area, or stop when it reaches the end of the memory region or block specified by software. Memory device 114 that stores the performance counter data may be an L2 cache, L3 cache, or memory.

Figure 2:
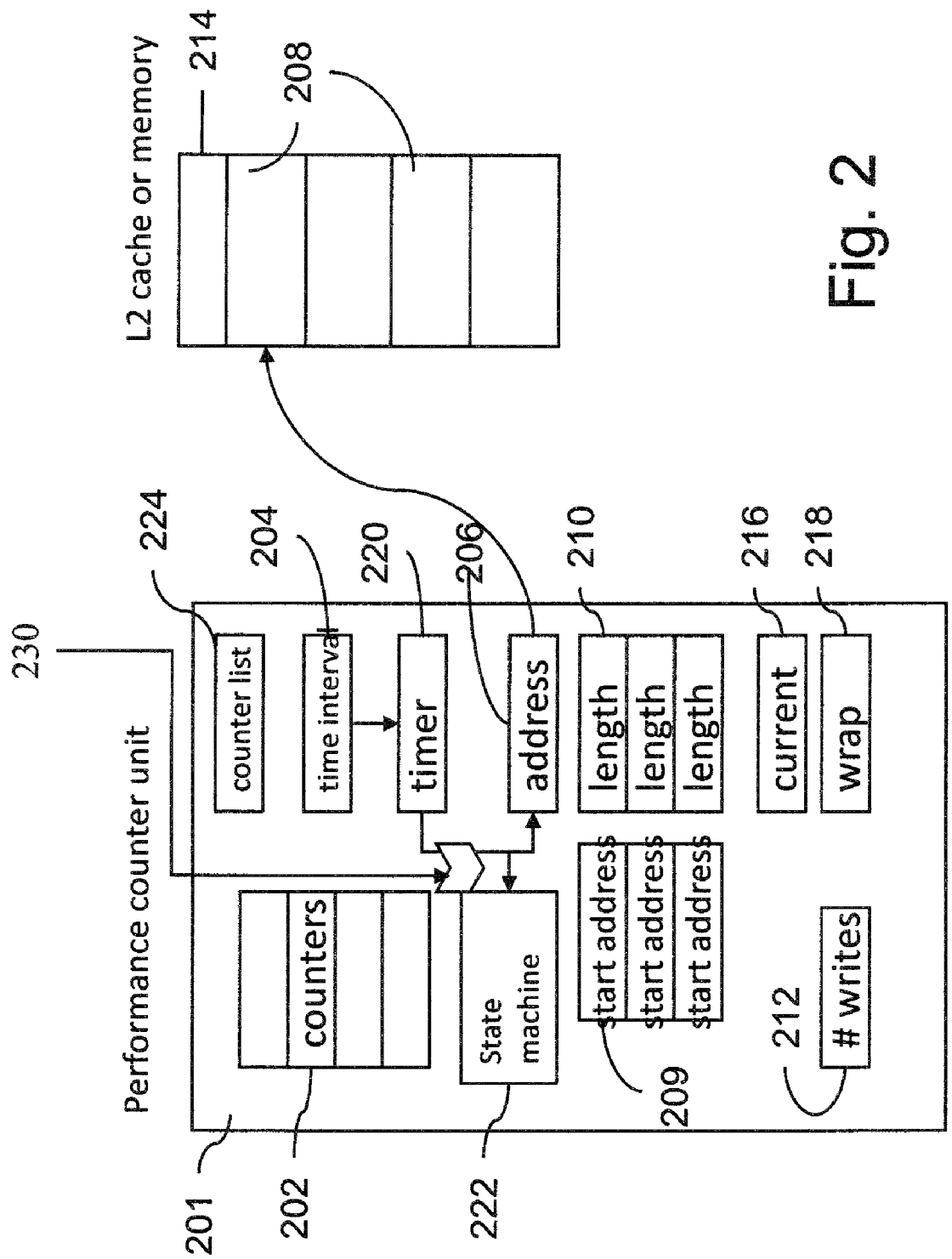
FIG. 2 is a diagram illustrating a hardware unit with a series of control registers that support collecting of hardware counter data to memory in another embodiment of the present disclosure.

FIG. 2 is a diagram illustrating a hardware unit with a series of control registers that support collecting of hardware counter data to memory in another embodiment of the present disclosure. The performance counter unit 201 includes a plurality of performance counters 202 collecting processor or hardware related activities and events.

A time interval register 204 may store a value that specifies the frequency of copying to be performed, for example, a time value that specifies to perform a copy every certain time interval. The value may be specified in seconds, milliseconds, instruction cycles, or others. A software entity such as an operating system or another application may write the value in the register 204. The time interval value 204 is set in the timer 220 for the timer 220 to being counting the time. Upon expiration of the time, the timer 220 notifies the state machine 222 to trigger the copying.

The state machine 222 reads the address value of 206 and begins copying the data of the performance counters specified in the counter list register 224 to the memory location 208 of the memory 214 specified in the address register 206. When the copying is done, the timer 220 is reset with the value specified in the time interval 204, and the timer 220 begins to count again.

The register 224 or another memory location stores the list of performance counters, whose data should be copied to memory 214. For example, each bit stored in the register 224 may correspond to one of the performance counters. If a bit is set, for example, the associated performance counter should be copied. If a bit is not set, for example, the associated performance counter should not be copied.

The memory location for writing and collecting the counter data may be a set of distinct memory blocks specified by set of addresses and lengths. Another set of registers or memory locations 209 may provide the set of start memory locations of the memory blocks 208. Yet another set of registers or memory locations 210 may indicate the lengths of the set of memory blocks 208 to be written to. The starting addresses 209 and lengths 210 may be organized as a list of available memory locations.

A hardware mechanism, such as a finite state machine 224 in the performance counter unit 201 may point from memory region to memory region as each one gets filled up. The state machine may use current pointer register or memory location 216 to indicate where in the multiple specified memory regions the hardware is currently copying to, or which of the pairs of start address 209 and length 210 it is currently using from the performance counter unit 201.

The state machine 222 uses the current address and length registers, as specified in 216, to calculate the destination address 206. The value in 216 stays unchanged until the state machine identifies that the memory block is full. This condition is identified by comparing the destination address 206 to the sum of the start address 209 and the memory block length 210. Once a memory block is full, the state machine 222 increments the current register 216 to select a different pair of start register 209 and length register 210.

Another register or memory location 218 may be used to store an indication as to whether the hardware should wrap back to the beginning of the area, or stop when it reaches the end of the memory region or block specified by software.

Another register or memory location 212 may store a value that specifies the number of times to write the above specified hardware performance counters to memory 214. Each time the state machine 222 initiates copying and/or storing, the value of the number of writes 212 is decremented. If the number reaches zero, the copying is not performed. Further copying from the performance counters 202 to memory 214 may be re-established after an intervention by software.

In another aspect, an external interrupt 230 or another signal may trigger the state machine 222 or another hardware component to start the copying. The external signal 230 may be generated outside of the performance monitoring unit 201 to start direct copying. For example, this signal may be an interrupt signal generated by a processor, or by some other component in the system.

Figure 3:
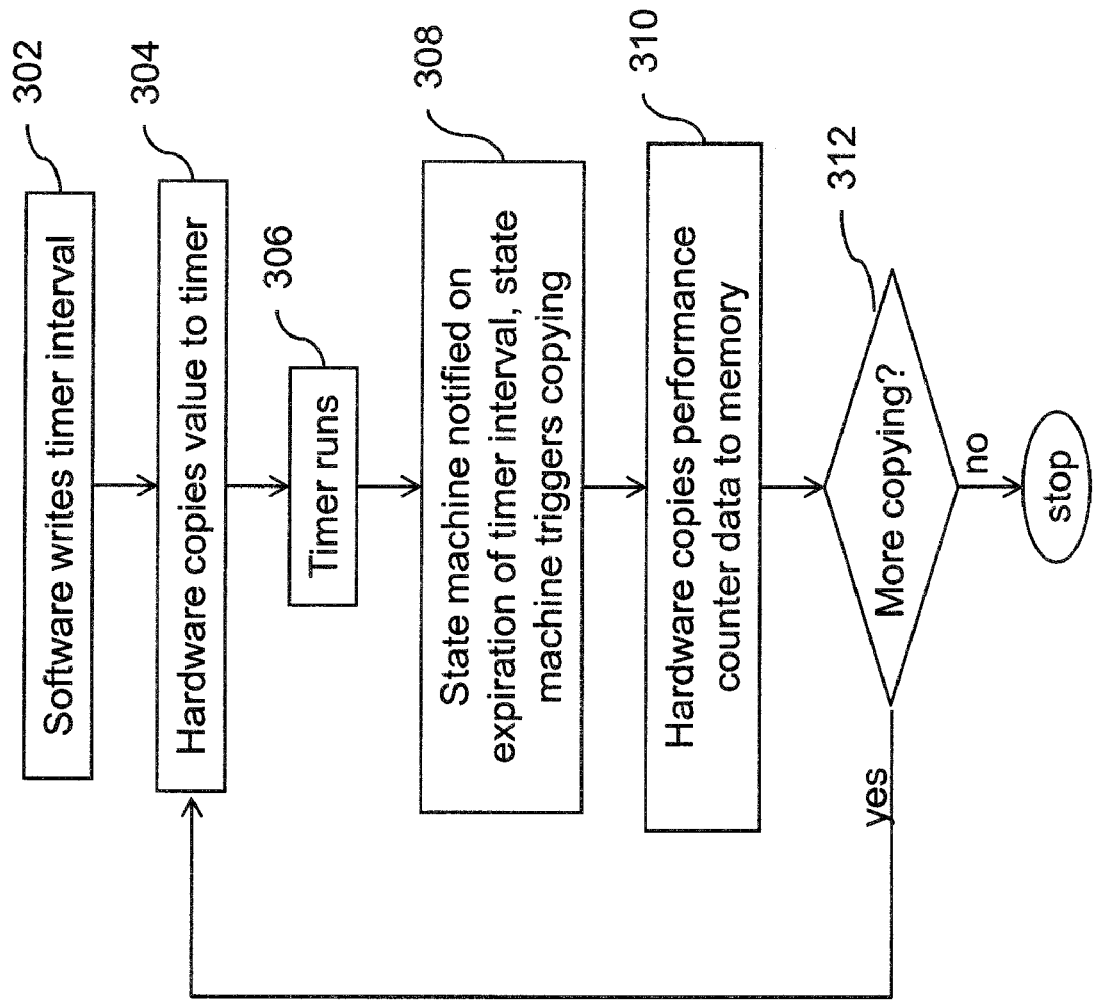
FIG. 3 is a flow diagram illustrating a hardware support method for collecting hardware performance counter data in one embodiment of the present disclosure.

FIG. 3 is a flow diagram illustrating a hardware support method for collecting hardware performance counter data in one embodiment of the present disclosure. At 302, a software thread writes time interval value into a designated register. At 304, a hardware thread reads the value and transfers the value into a timer register. At 306, the timer register counts down the time interval value, and when the timer count reaches zero, notifies a state machine. Any other method of detecting expiration of the timer value may be utilized. At 308, the state machine triggers copying of all or selected performance counter register values to specified address in memory. At 310, hardware thread copies the data to memory. At 312, the hardware thread checks whether more copying should be performed, for example, by checking a value in another register. If more copying is to be done, then the processing returns to 304.

Figure 4:
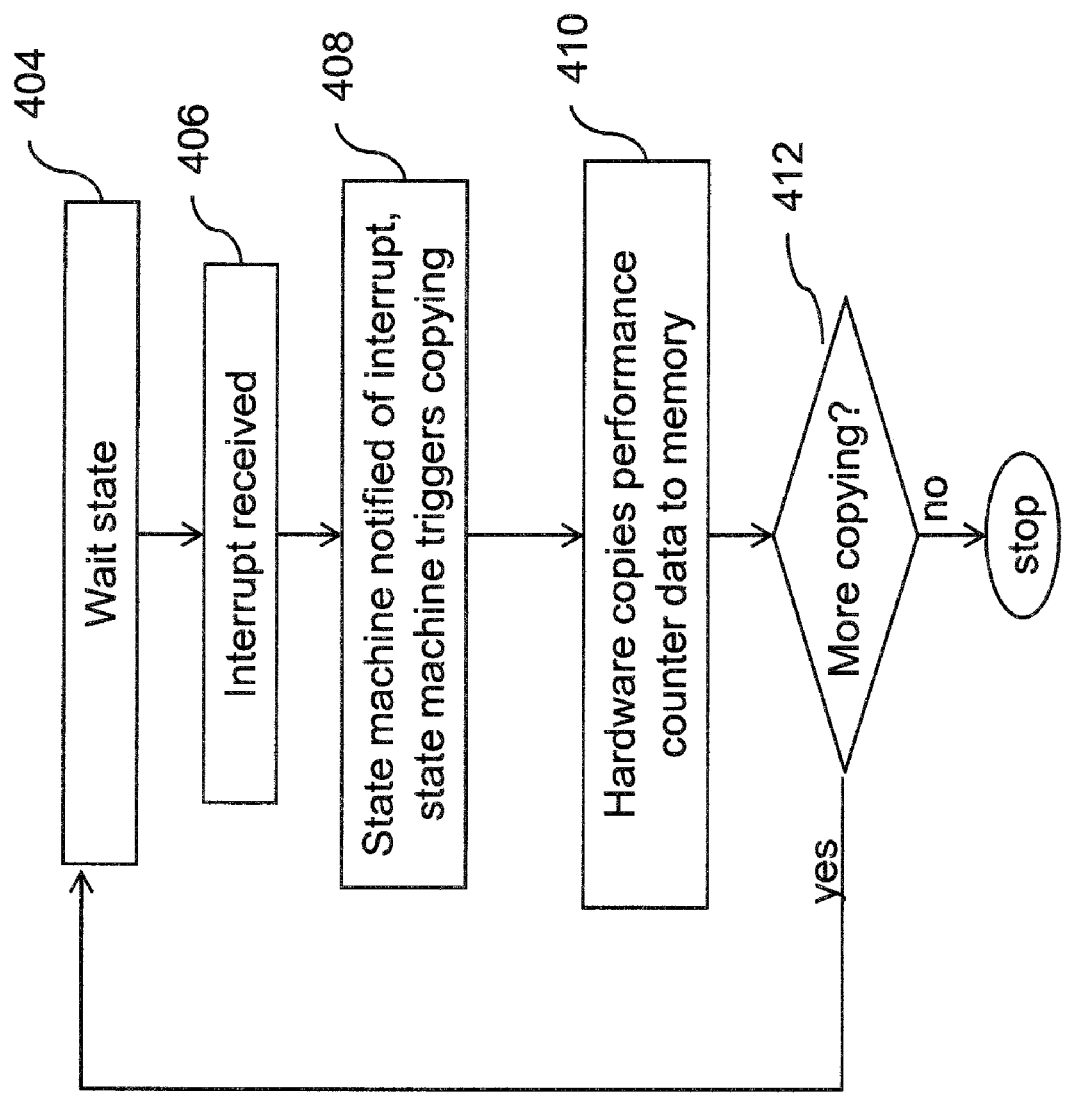
FIG. 4 is a flow diagram illustrating a hardware support method for collecting hardware performance counter data in another embodiment of the present disclosure.

FIG. 4 is a flow diagram illustrating a hardware support method for collecting hardware performance counter data in another embodiment of the present disclosure. At 404, a state machine or another like hardware waits, for example, for a signal to start performing copies of the performance counters. The signal may be an external interrupt initiated by another device or component, or another notification. The state machine need not be idle while waiting. For example, the state machine may be performing other tasks while waiting. At 406, the state machine receives an interrupt or another signal. At 408, the state machine or another hardware triggers copying of hardware performance counter data to memory. At 410, performance counter data is copied to memory. At 412, it is determined whether there is more copying to be done. If there is more copying to be done, the step proceeds to 404. If all copies are done, method stops.

While the above description referred to a timer element that detects the time expiration for triggering the state machine for, it should be understood that other devices, elements, or methods may be utilized for triggering the state machine. For instance, an interrupt generated by another element or device may trigger the state machine to begin copying the performance counter data.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
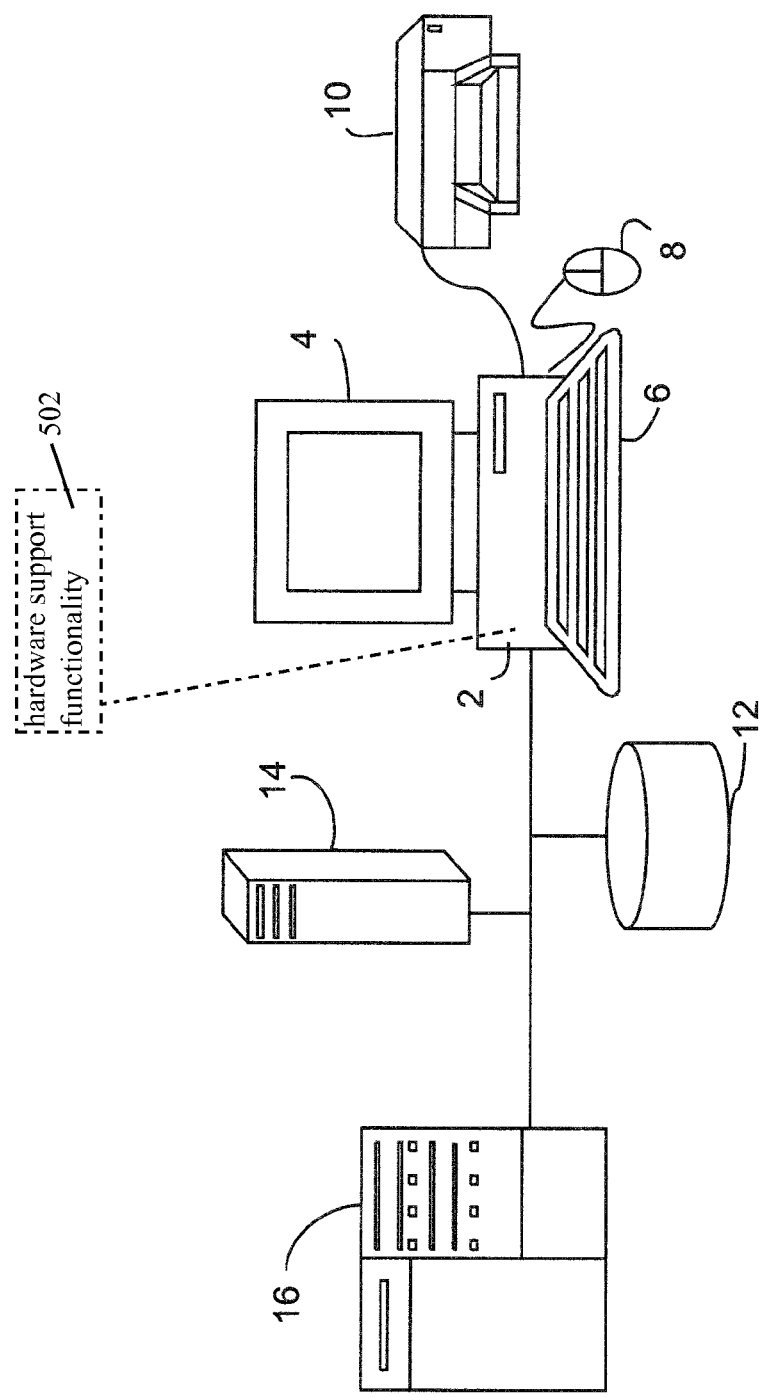
FIG. 5 illustrates an example of a computer system, in which the systems and methodologies of the present disclosure may be carried out or executed.

Referring now to FIG. 5, the systems and methodologies of the present disclosure may be carried out or executed in a computer system that includes a processing unit 2, which houses one or more processors and/or cores, memory and other systems components (not shown expressly in the drawing) that implement a computer processing system, or computer that may execute a computer program product. The one or more cores may execute the one or more hardware support functionalities 502 disclosed herein. The computer program product may comprise media, for example a hard disk, a compact storage medium such as a compact disc, or other storage devices, which may be read by the processing unit 2 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 4 for presenting output displays and providing a display through which the user may input data and interact with the processing system, for instance, in cooperation with input devices such as the keyboard 6 and mouse device 8 or pointing device. The computer processing system may be also connected or coupled to one or more peripheral devices such as the printer 10, scanner (not shown), speaker, and any other devices, directly or via remote connections. The computer processing system may be connected or coupled to one or more other processing systems such as a server 10, other remote computer processing system 14, network storage devices 12, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 2, 14, 16), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server, A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A device for hardware supported performance counter data collection, comprising:
    a plurality of performance counters operable to collect one or more counts of one or more selected activities;
    a first storage element operable to store data value representing time interval;
    a timer element operable to read the data value and detect expiration of the time interval based on the data value;
    a second storage element operable to store an address of a memory location; and
    a state machine operable to receive the signal associated with the detected expiration of the time interval and trigger hardware copying of data in selected one or more of the plurality of performance counters to the memory location whose address is stored in the second storage element,
    wherein the memory location and the data value representing time interval are set by software, and the state machine comprises the hardware wherein the hardware copies the data of the performance counters in response to detecting the expiration of the time interval without the software getting involved.

2. The device of claim 1, wherein the first storage element is programmable by a software thread.

3. The device of claim 1, wherein the first storage element is a register.

4. The device of claim 1, wherein the first storage element is a memory location.

5. A device for hardware supported performance counter data collection, comprising:
a plurality of performance counters operable to collect one or more counts of one or more selected activities;
a first storage element operable to store an address of a memory location;
a second storage element operable to store a value indicating whether the hardware should begin copying; and
a state machine operable to detect the value in the second storage element and trigger hardware copying of data in selected one or more of the plurality of performance counters to the memory location whose address is stored in the first storage element,
wherein the memory location and the value indicating whether the hardware should begin copying is set by software, and
the state machine comprises the hardware wherein the hardware copies the data of the performance counters in response to detecting the value without the software getting involved.

6. The device of claim 5, wherein the second storage element is operable to store a value that indicates a number of times the hardware should copy, each time the hardware performs copying the value being decremented.

7. The device of claim 5, wherein the second storage element is operable to store an on or off bit that indicates whether the hardware should copy or not.

8. The device of claim 5, further including a third storage element operable to store data indicating how frequently to perform copying.

9. The device of claim 5, further including a fourth storage element having a plurality of bit fields, each bit field associated with one of the plurality of performance counters, said each bit field indicating whether an associated performance counter is to be copied.

10. The device of claim 5, further including a fifth storage element storing value that indicates size of the memory location reserved for copying.

11. The device of claim 5, wherein the memory location includes one or more of L2 cache.

12. The device of claim 5, further including a sixth storage element storing a series of memory regions to copy.

13. The device of claim 12, further including a seventh storage element storing a value indicating whether the hardware should wrap around to beginning of the memory location or stop if the hardware reaches end of memory region reserved for copying.

14. The device of claim 12, further including an eighth storage element storing an indication of which memory region the hardware is copying to.

15. A method for hardware supported performance counter data collection, comprising:
a software thread writing into a first storage element an address of memory;
a software thread writing into a second storage element an indication of whether to copy; and
a hardware thread detecting the indication of whether to copy from the second storage element and in response to detecting that the hardware should copy, performing a copy of data in one or more performance counters to memory region indicated by the address,
wherein the hardware copies the data of the performance counters in response to detecting the value without the software getting involved.

16. The method of claim 15, wherein the indication of whether to copy is a non-zero value and the method further includes decrementing the non-zero value each time copy is performed.

17. The method of claim 15, further including:
setting a timer with a time interval value; and
in response to the timer reaching the time interval value, triggering the hardware thread to begin copying.

18. The method of claim 15, wherein the performing a copy includes performing a copy of data in a selected one or more performance counters to memory region indicated by the address.

19. The method of claim 15, wherein the one or more performance counters to copy are indicated as bit fields in a storage element.

20. A computer readable storage medium storing a program of instructions executable by a machine to perform a method for hardware supported performance counter data collection, comprising:
a software thread writing into a first storage element an address of memory;
a software thread writing into a second storage element an indication of whether to copy; and
a hardware thread detecting the indication of whether to copy from the second storage element and in response to detecting that the hardware should copy, performing a copy of data in one or more performance counters to memory region indicated by the address,
wherein the hardware copies the data of the performance counters in response to detecting the value without the software getting involved.

21. The computer readable storage medium of claim 20, wherein the indication of whether to copy is a non-zero value and the method further includes decrementing the non-zero value each time copy is performed.

22. The computer readable storage medium of claim 20, further including:
setting a timer with a time interval value; and
in response to the timer reaching the time interval value, triggering the hardware thread to begin copying.

23. The computer readable storage medium of claim 20, wherein the performing a copy includes performing a copy of data in a selected one or more performance counters to memory region indicated by the address.

24. The computer readable storage medium of claim 20, wherein the one or more performance counters to copy are indicated as bit fields in a storage element.

* * * * *